US008389945B1

(12) United States Patent
Vinogradov et al.

(10) Patent No.: US 8,389,945 B1
(45) Date of Patent: Mar. 5, 2013

(54) OBJECT DETECTING SYSTEM IN IMAGING-BASED BARCODE READERS (75) Inventors: Igor R. Vinogradov, Oakdale, NY (US); Robert W. DiGiovanna, Shirley, NY (US); Yuly Mitelman, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 26 days.

(21) Appl. No.: 13/217,347

(22) Filed: Aug. 25, 2011

(51) Int. Cl.
*G06K 7/10* (2006.01)
(52) U.S. Cl. ..................................................... 250/371
(58) Field of Classification Search .................. 250/271, 250/340, 341.1–341.8
See application file for complete search history.

(56) References Cited

U.S. PATENT DOCUMENTS

| | | | | |
|---|---|---|---|---|
| 6,061,121 | A * | 5/2000 | Holl et al. | 356/71 |
| 6,373,520 | B1 * | 4/2002 | Cadieux et al. | 348/86 |
| 8,079,523 | B2 * | 12/2011 | Barkan | 235/462.41 |
| 8,146,821 | B2 * | 4/2012 | Barkan et al. | 235/462.24 |
| 2001/0026355 | A1 * | 10/2001 | Aoki et al. | 355/30 |
| 2002/0040934 | A1 * | 4/2002 | Itou et al. | 235/462.43 |
| 2007/0091332 | A1 * | 4/2007 | Nunnink | 358/1.6 |
| 2008/0314987 | A1 * | 12/2008 | Kotlarsky et al. | 235/462.07 |
| 2009/0057410 | A1 * | 3/2009 | Kotlarsky et al. | 235/462.07 |
| 2010/0001075 | A1 * | 1/2010 | Barkan | 235/462.41 |
| 2010/0147952 | A1 * | 6/2010 | Carlson | 235/462.41 |
| 2012/0111942 | A1 * | 5/2012 | Liu | 235/437 |
| 2012/0126015 | A1 * | 5/2012 | Wittenberg et al. | 235/462.41 |

* cited by examiner

*Primary Examiner* — Kiho Kim
(74) *Attorney, Agent, or Firm* — Nong-Qiang Fan (57) ABSTRACT

An apparatus for capturing images of a target object having a barcode. The apparatus includes a reflector, an LED emitting mostly invisible light, and a photodetector. The LED is configured to emit a first portion of the invisible light toward the target object directly and to emit a second portion of the invisible light toward the reflector. The reflector is configured to redirect at least some of the second portion of the invisible light toward the target object. The photodetector is configured to detect returned invisible light from the target object to generate an electrical signal.

25 Claims, 10 Drawing Sheets

OBJECT DETECTING SYSTEM IN IMAGING-BASED BARCODE READERS

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

Figure 1A:
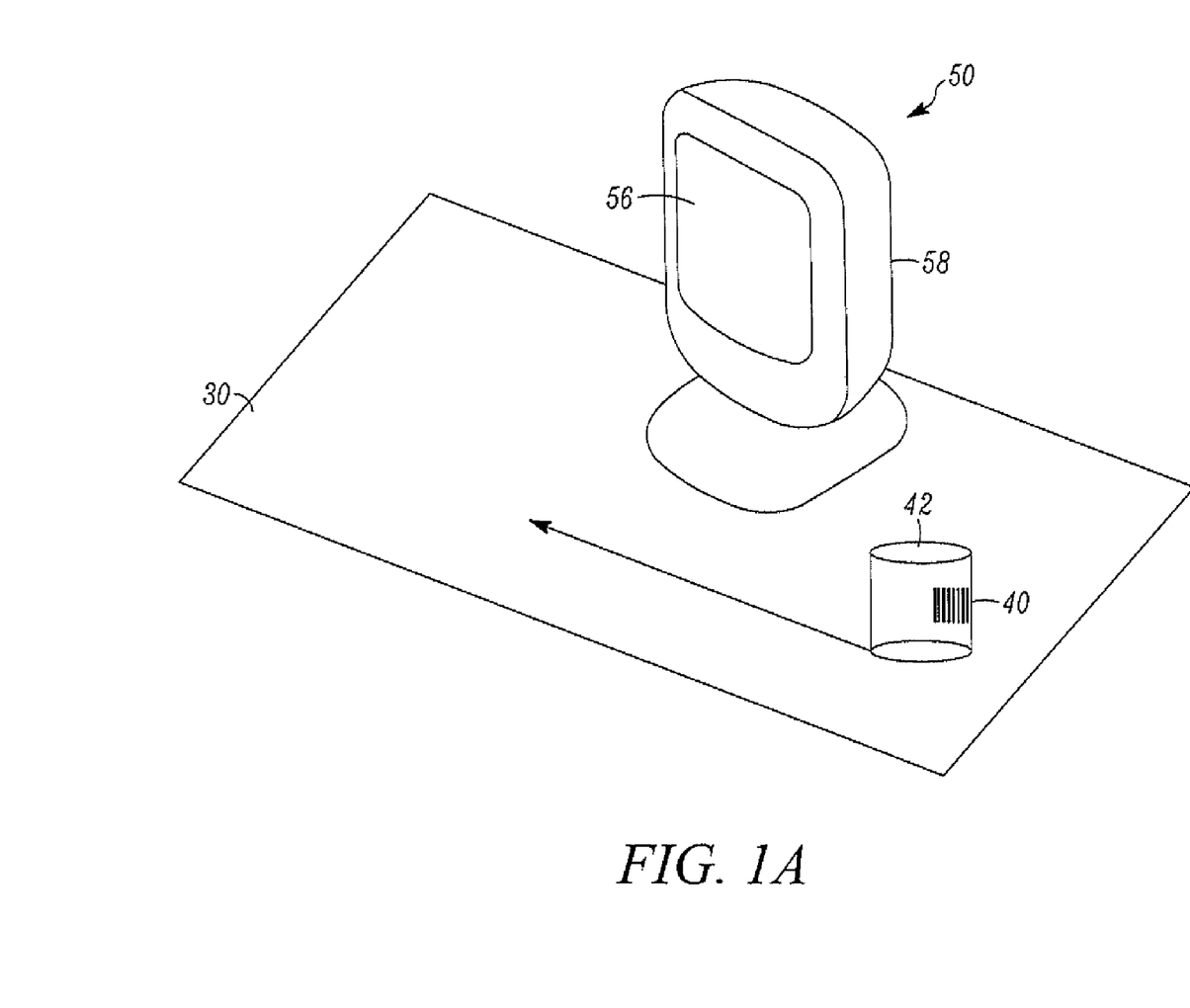
FIG. 1A and FIG. 1B depict an imaging scanner in accordance with some embodiments.
Figure 1B:
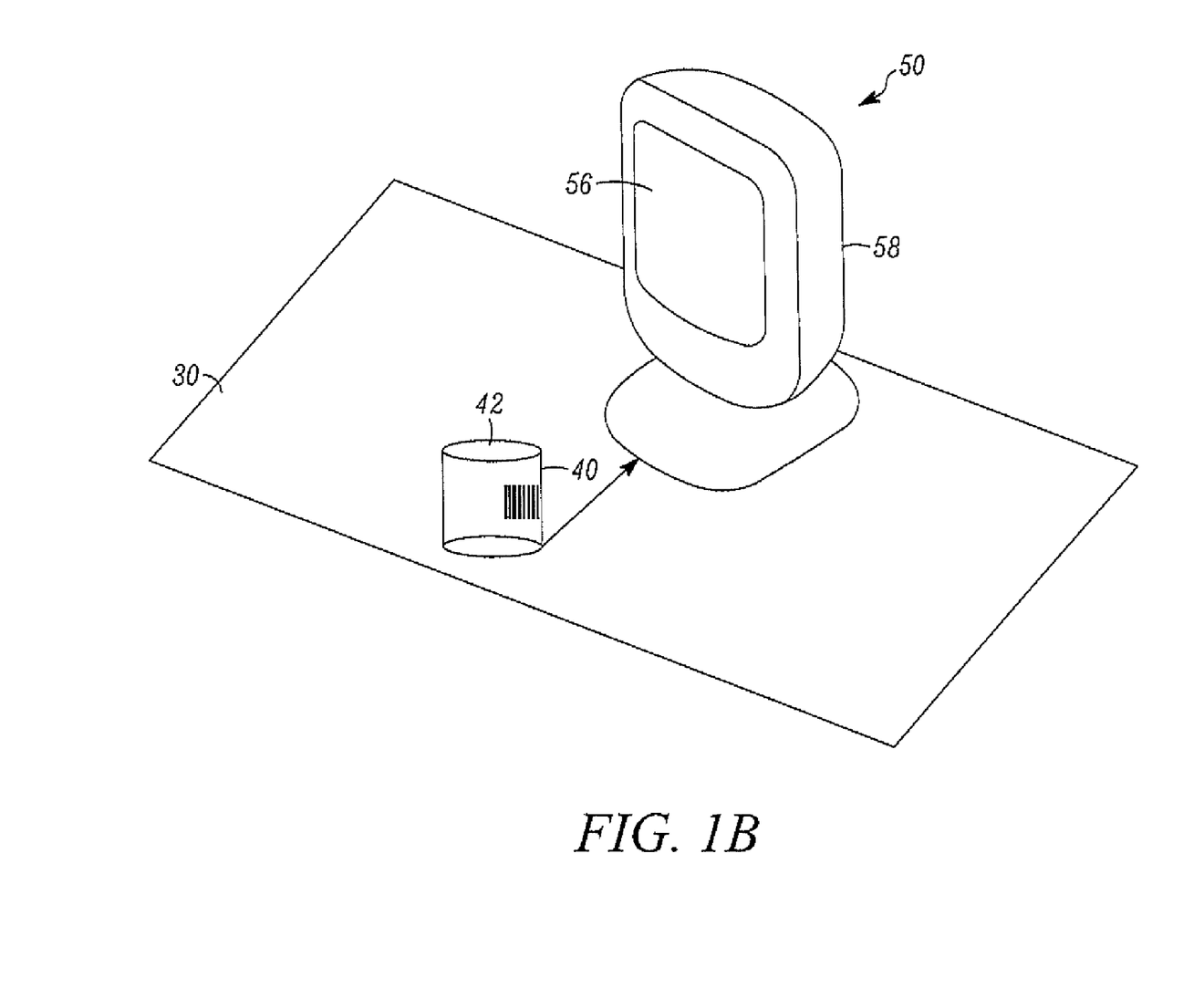

FIG. 1A and FIG. 1B depict an imaging scanner 50 in accordance with some embodiments. The imaging scanner 50 has a window 56 and a housing 58. The imaging scanner 50 is typically a portable reader that has a base for supporting itself on a flat surface 30, such as, a countertop. The window 56 generally faces an operator at the workstation. As shown in FIG. 1A, the operator can slide or swipe the product 40 past the window 56 from right to left, or from left to right, in a "swipe" mode, to let an image of the barcode 40 on the product 42 be captured by the imaging scanner 50. Alternatively, the operator can present the barcode 40 on the product 42 to the center of the window 56 in a "presentation" mode. The choice depends on operator preference or on the layout of the workstation.

SUMMARY

In one aspect, the invention is directed to an apparatus for capturing images of a target object having a barcode. The apparatus includes a housing, an illumination source within the housing for providing illumination directed toward a target object, and an imaging sensor having an array of photosensitive elements for capturing an image from the target object. The apparatus also includes a reflector within the housing, a light emitting diode (LED) operative to emit mostly invisible light within an invisible bandwidth, and a photodetector. The LED is configured to emit a first portion of the invisible light toward the target object directly and to emit a second portion of the invisible light toward the reflector, and wherein the reflector is configured to redirect at least some of the second portion of the invisible light toward the target object. The photodetector is configured to detect returned invisible light from the target object to generate an electrical signal. A controller in the apparatus is configured to energize the illumination source for providing the illumination light for imaging capturing with the imaging sensor toward the target object only if the electrical signal generated by the photodetector indicates that the returned invisible light from the target object is detected.

The advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
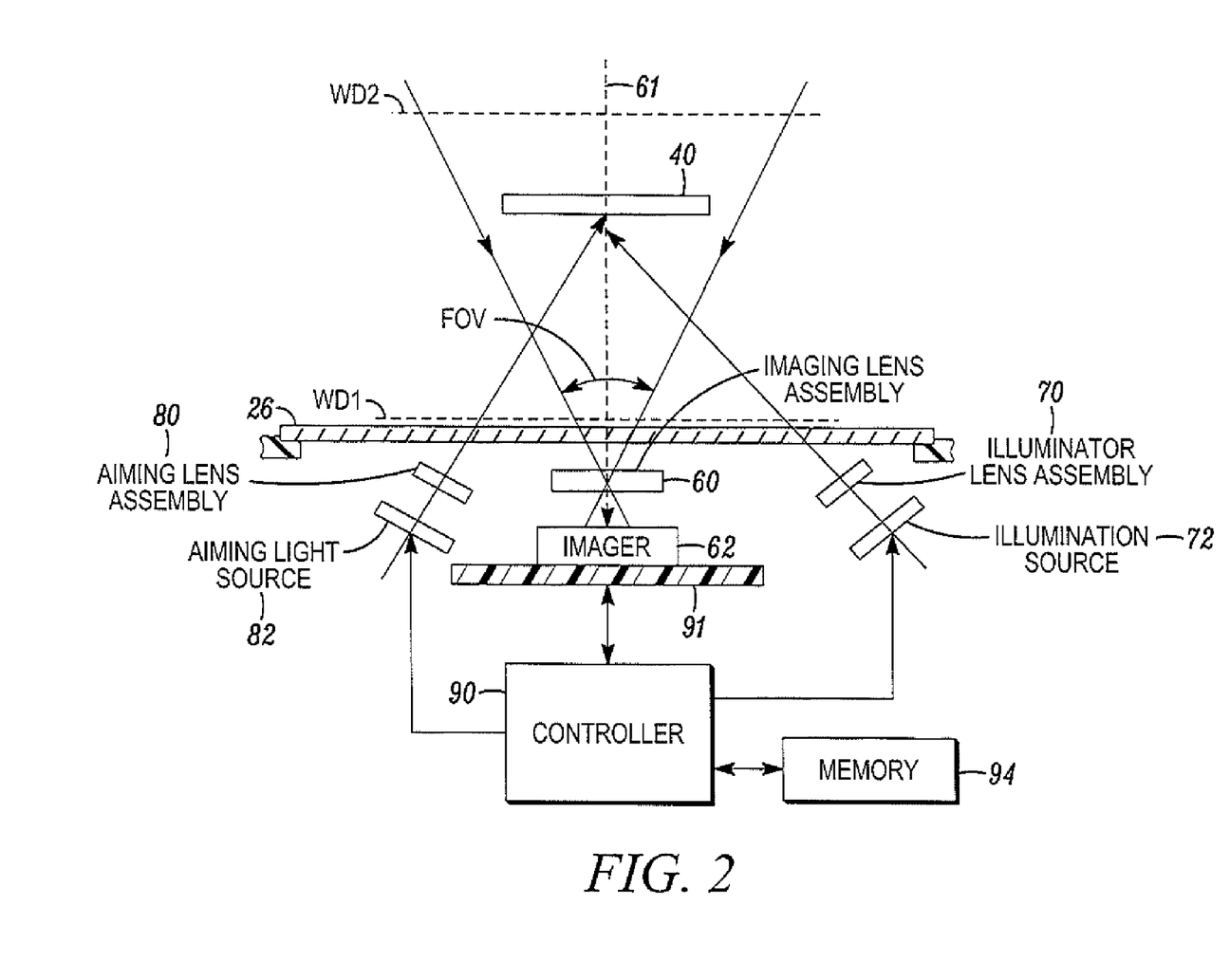
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens assembly 60; (2) an illuminating lens assembly 70 positioned in front of an illumination source 72; (3) an aiming lens assembly 80 positioned in front of an aiming light source 82; and (4) a controller 90. In FIG. 2, the imaging lens assembly 60, the illuminating lens assembly 70, and the aiming lens assembly 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens assembly 60 along an optical path or axis 61 through the window 56. Generally, the imaging sensor 62 and the imaging lens assembly 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens assembly 60. Some of the imaging scanners can include an auto-focus system to enable a barcode be more clearly imaged with the imaging sensor 62 based on the measured distance of this barcode. In some implementations of the auto-focus system, the focus length of the imaging lens assembly 60 is adjusted based on the measured distance of the barcode. In some other implementations of the auto-focus system, the distance between the imaging lens assembly 60 and the imaging sensor 62 is adjusted based on the measured distance of the barcode.

In FIG. 2, the illuminating lens assembly 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens assembly 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

The illumination source 72 usually is energized to address low ambient light conditions and to minimize hand jitter impact or swiping objects though the FOV on reading performance. On the other hand having bright illumination of an imaging scanner in constantly on state is annoying and bothersome for the user. It is also not efficient from power management perspective. Therefore it is beneficial to have an object sensing system which energizes illumination system only if the object of interest is presented within the predetermined FOV of the imaging scanner 50 and at a certain distance from the scanner.

Figure 3A:
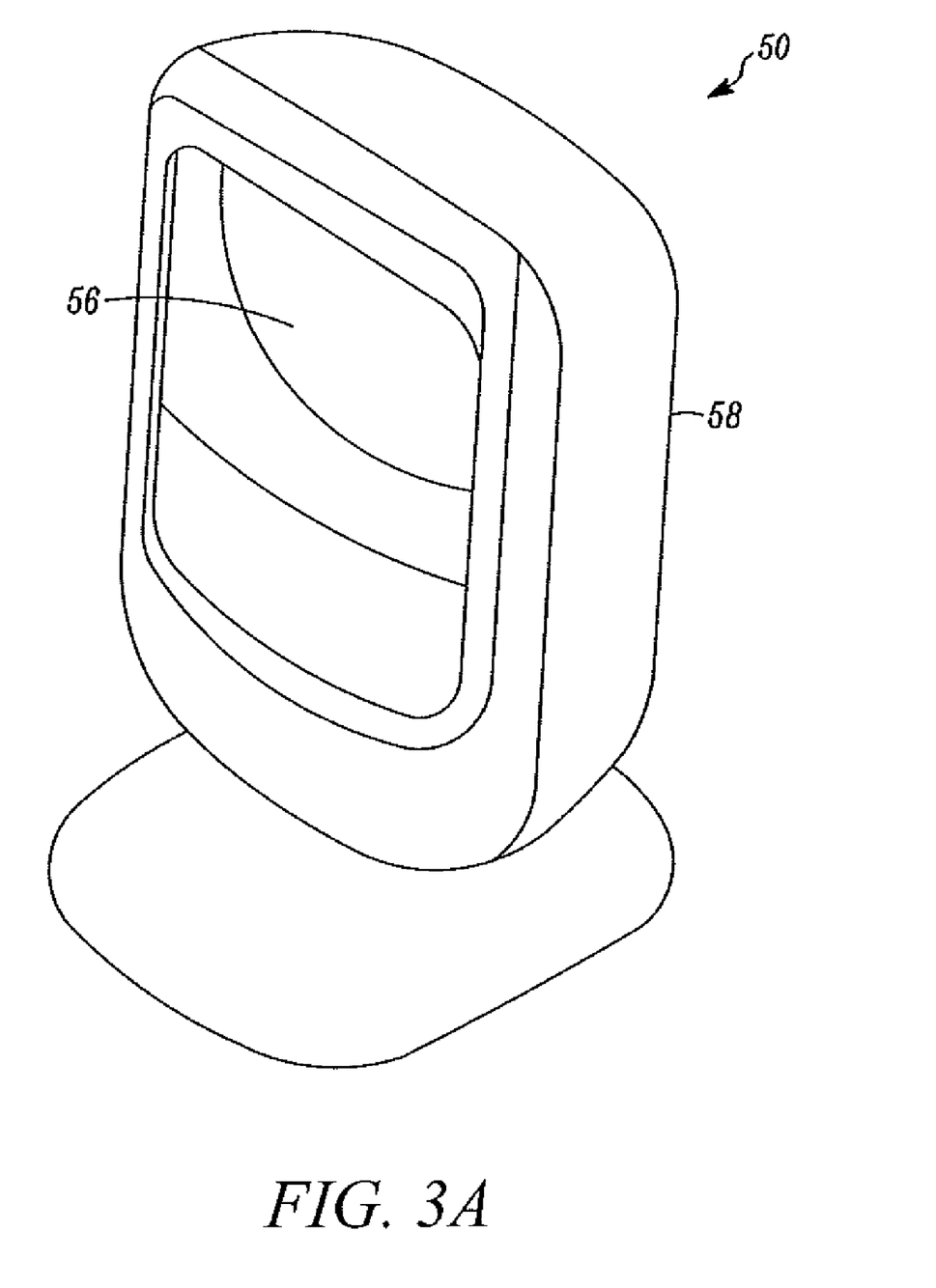
FIGS. 3A-3B depict an imaging scanner that includes an object detecting system behind the window of the imaging scanner.
Figure 3B:
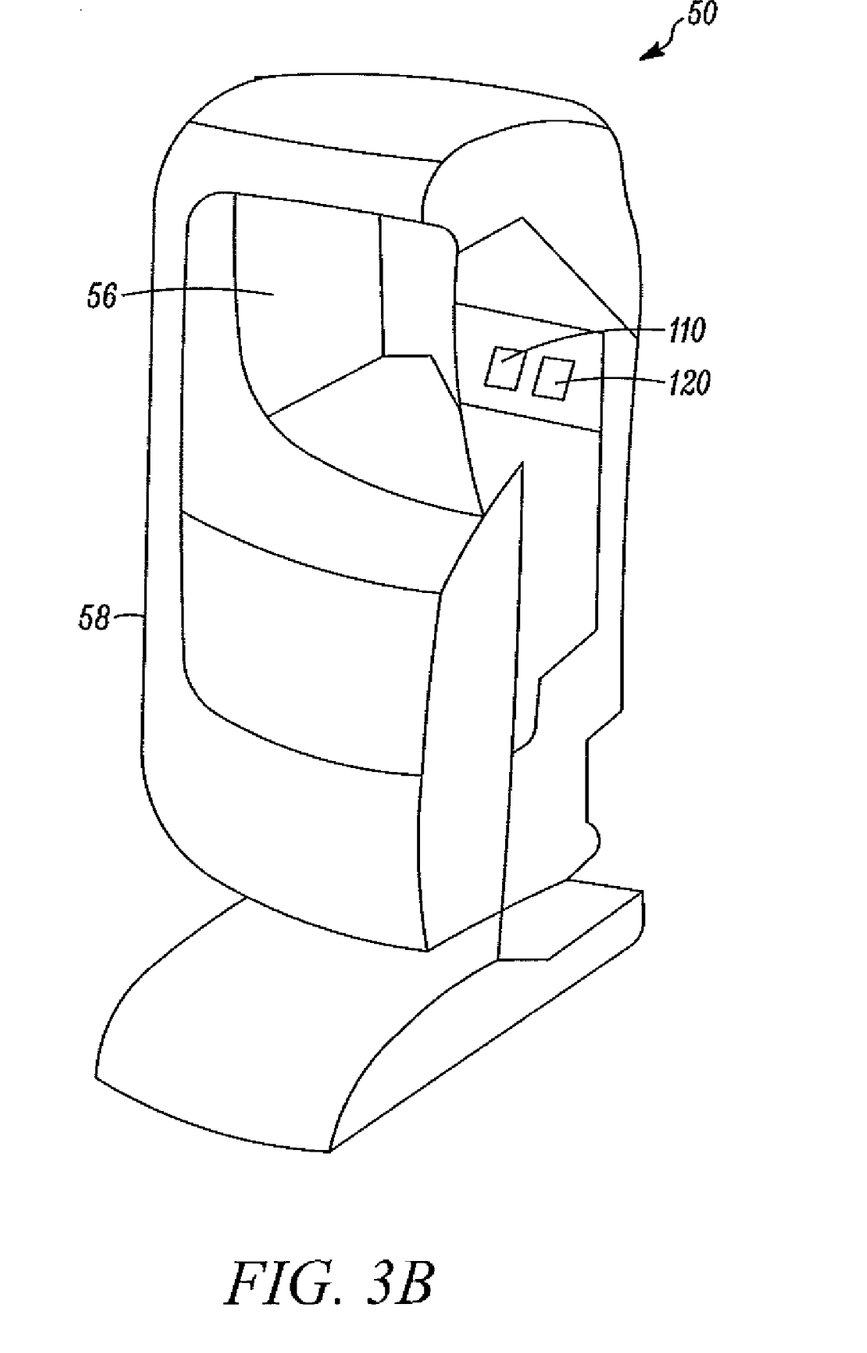

FIGS. 3A-3B depict an imaging scanner 50 that includes an object detecting system behind the window 56. The object detecting system in FIG. 3B includes an infrared LED 110 and a photodetector 120. In some existing implementations, the infrared light projecting out of the window 56 mainly originates from one particular area—LED chip which may or may not have an auxiliary lens. These implementations place some limitation on the effectiveness of the object detecting system. This limitation becomes apparent in case of reading barcodes from cell phones, a user application that has recently become very popular. Typically, cell phone screen is designed in such a way which minimizes reflected light from its surface. Therefore reflected/scattered light of the object sensor LED is very low, which is nearly impossible for detection at larger distances. In general cell phones have very strong specular reflection from the screen. Therefore in a particular orientation of the cell phone, the returned specular reflection signal is quite strong and the object sensor can be activated at a longer distance. Unfortunately, this occurs if the cell phone is presented at a particular orientation only within a limited range of angle.

The present specification provides an improved object detecting system where a plurality of virtual light sources are created from a single source. An advantage of this improved object detecting system is that multiple specular reflections occur from cell phone screen, which enables cell phone detection more effective at longer distances and less dependable on phone screen orientation.

Figure 4:
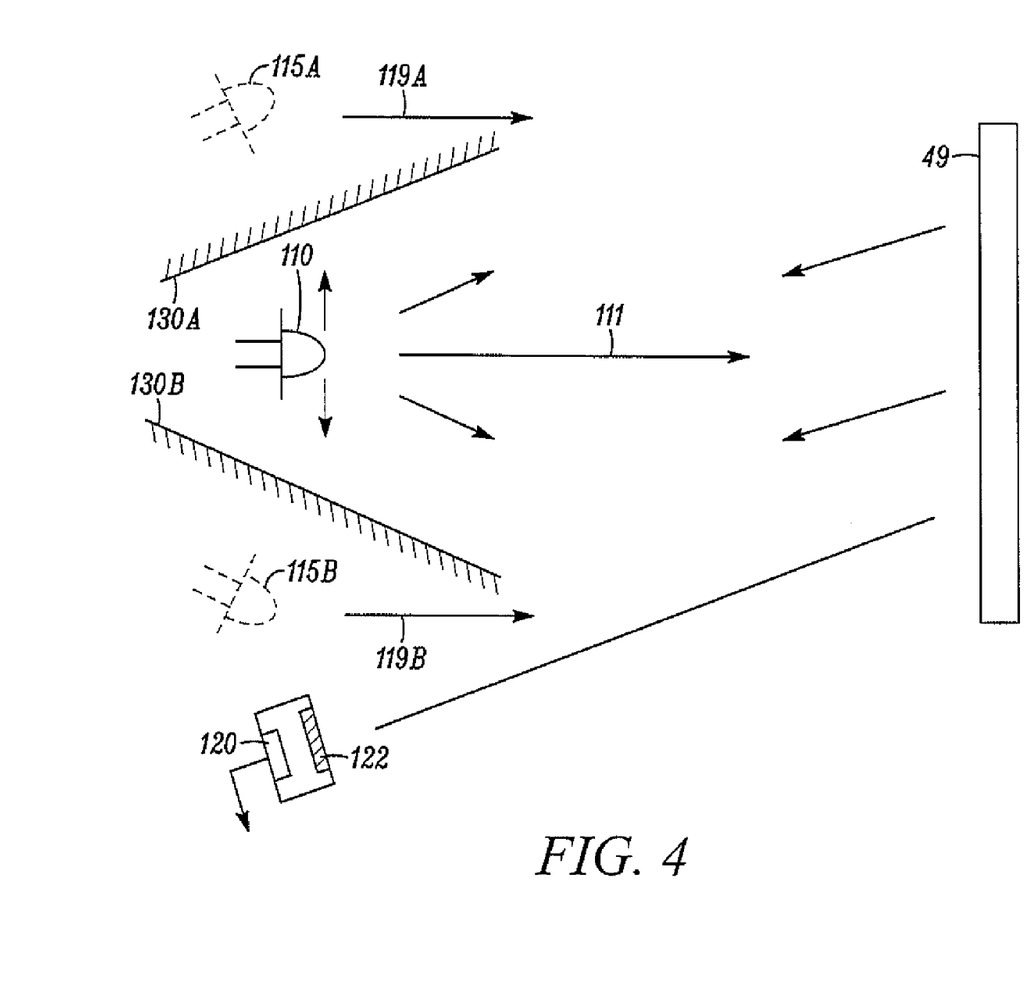
FIG. 4 depicts an object detecting system with multiple virtual light sources in accordance with some embodiments.

FIG. 4 depicts an object detecting system with multiple virtual light sources in accordance with some embodiments. The object detecting system includes an infrared LED 110 and a photodetector 120. The object detecting system also includes two mirrors 130A and 130B. In some implementations, the two mirrors 130A and 130B are facing each other with an inclined angle larger than 30 degrees. The mirrors 130A and 130B create virtual light sources 115A and 115B respectively. Therefore when one looks at the light source 110, two additional virtual light sources 115A and 115B appear on each side. By these means three light sources (i.e., 110, 115A, and 115B) have been created. The light sources 110, 115A, and 115B respectively project infrared light 111, 119A, and 119B onto a cell phone screen 49. Each source generates its own specular reflection from the cell phone screen 49 presented in front of the object sensor. The signal is detected by the photodetector 120.

An optical filter 122 may be used to filter out ambient light for better signal to noise ratio. It has to be understood that one, two, three, or more reflective mirrors or surfaces can be used in this arrangement for generating virtual light sources. Surfaces may or may not be joined. For example, plastic materials can have high reflectivity of about 30% at glazing angles of incident light. If case reflective surfaces have rough finish and scatter light at certain angle, it may further improve the possibility of catching specular refection by the photodetector.

FIGS. 5A-5B and 6A-6B depict an imaging scanner 50 that includes an improved object detecting system in accordance with some embodiments. The imaging scanner 50 includes a housing 58, an illumination source 72 for providing illumination directed toward a target object in front of the window 56, and an imaging sensor 62 for capturing an image from the target object. An illuminating lens assembly 70 is positioned in front of the illumination source 72. An imaging lens assembly 60 is positioned in front of the imaging sensor 62. The imaging scanner 50 also includes a mirror 130 in the housing 58. The mirror 130 is used to reflect the illumination from the illumination source 72 toward the target object in front of the window 56 and to reflect returned light from the target object towards imaging lens 60 and being projected onto the imaging sensor 62.

Figure 5A:
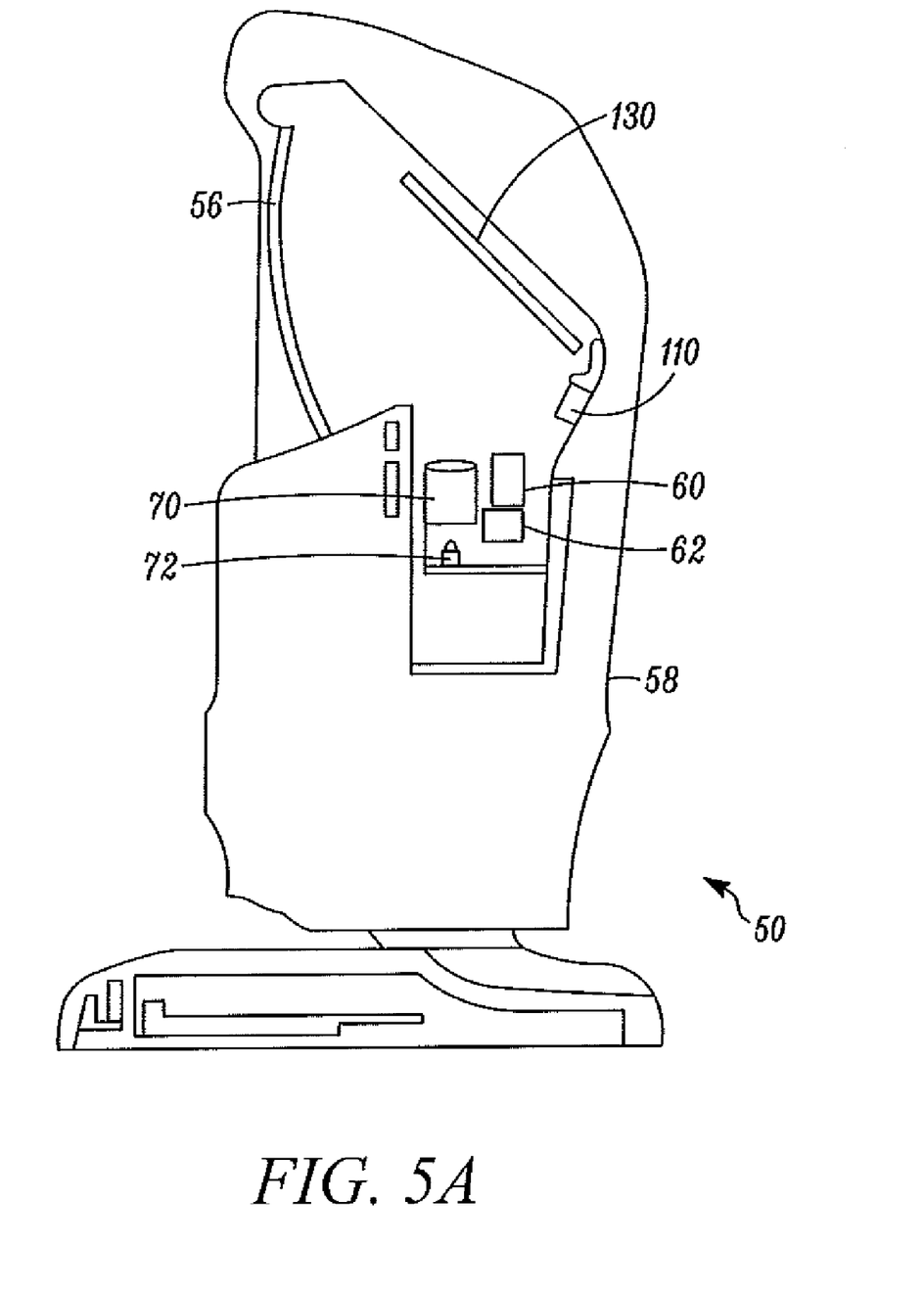
FIGS. 5A-5B and 6A-6B depict an imaging scanner that includes an improved object detecting system in accordance with some embodiments.
Figure 5B:
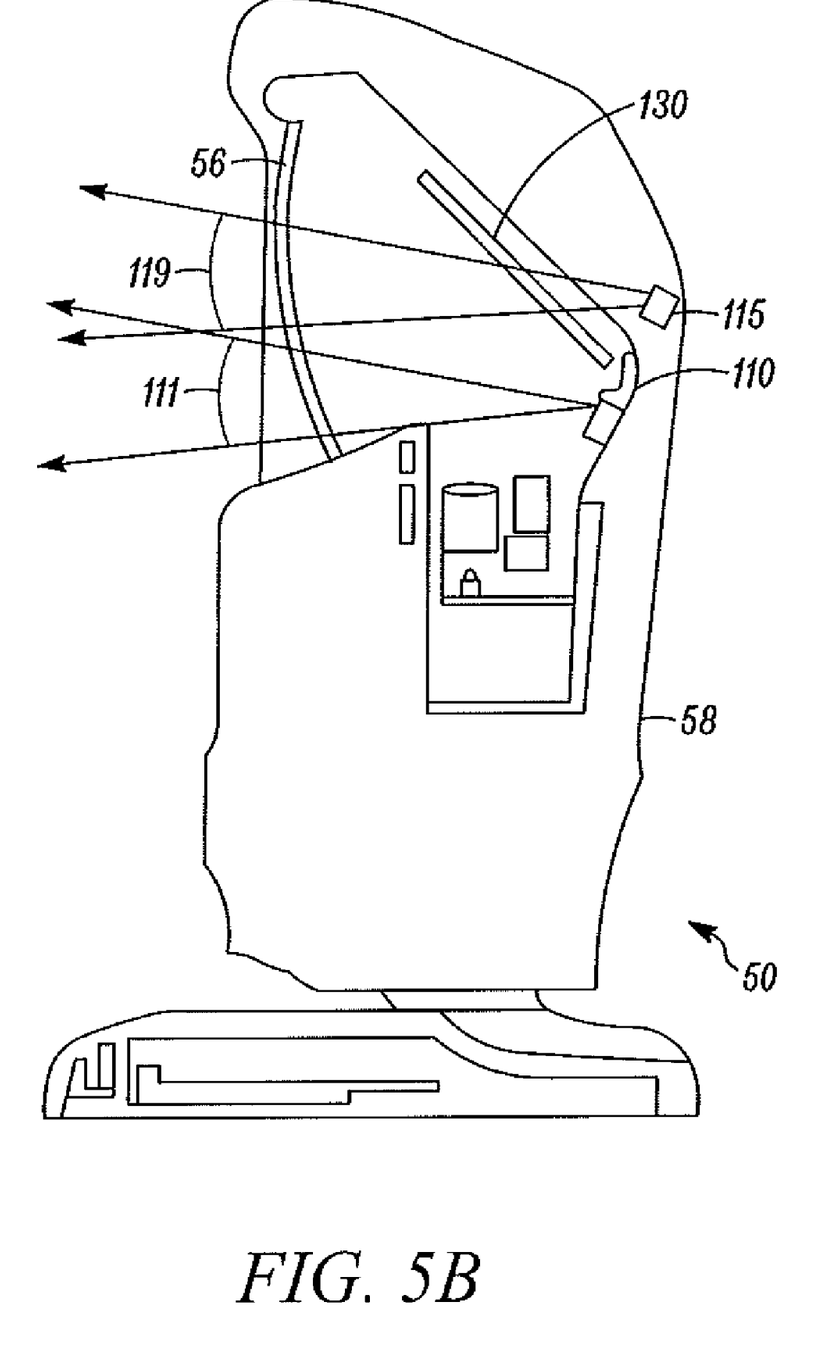

As shown in FIG. 5B, the object detecting system of the imaging scanner 50 includes an LED 110 that emits mostly invisible light (e.g., infrared light, approximately 800 NM). The LED 110 is configured to emit a first portion of the invisible light toward the target object directly and to emit a second portion of the invisible light toward the mirror 130. Because of the mirror 130, a virtual light source 115 is generated. The light sources 110 and 115 respectively project invisible light 111 and 119 out of the window 56. If there is a target object presence in front of the window 56, some of the invisible light 111 and 119 can be reflected back into the window 56, and the returned invisible light from the target object can be detected by a photodetector (which is not shown in FIG. 5B). Generally, a portion of the invisible light emitted by the LED 110 can be redirected toward the target object by a reflector. While the mirror 130 can be used as the reflector, there are many other possible implementations of the reflector.

Figure 6A:
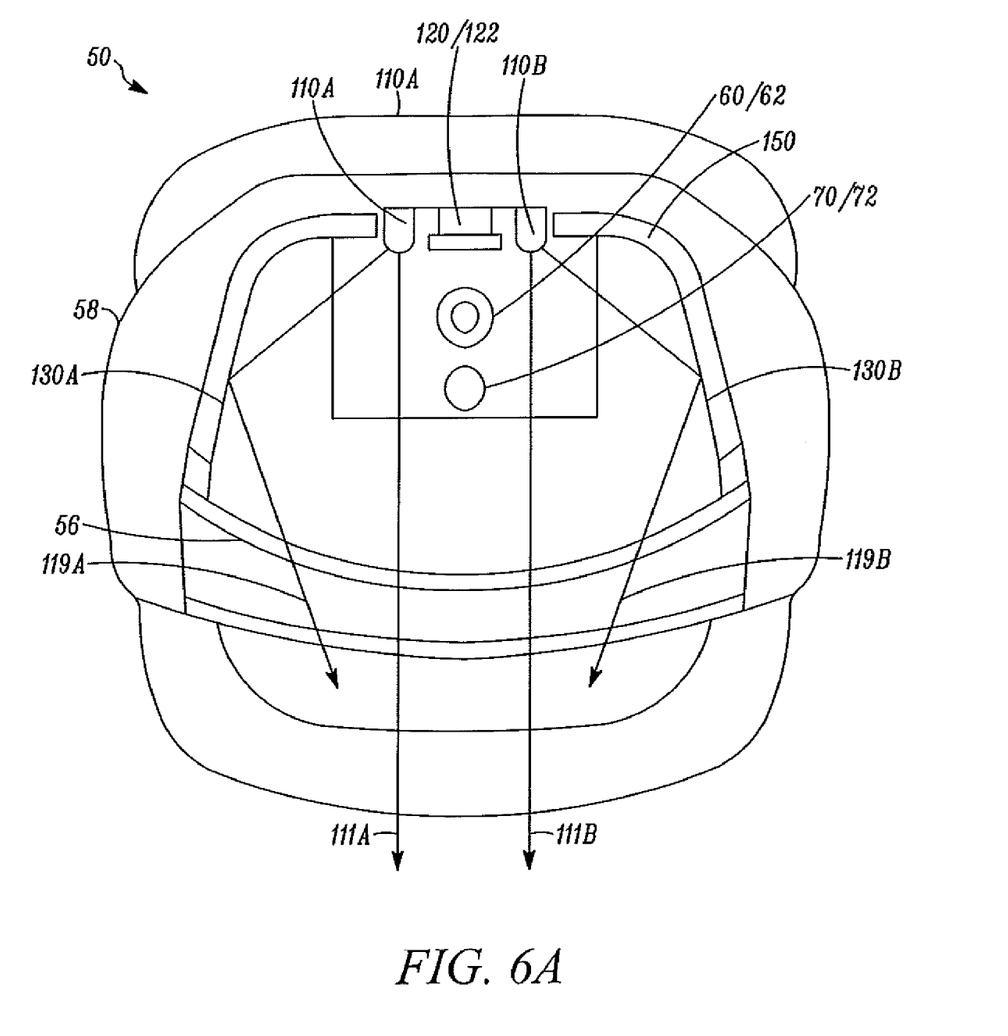
Figure 6B:
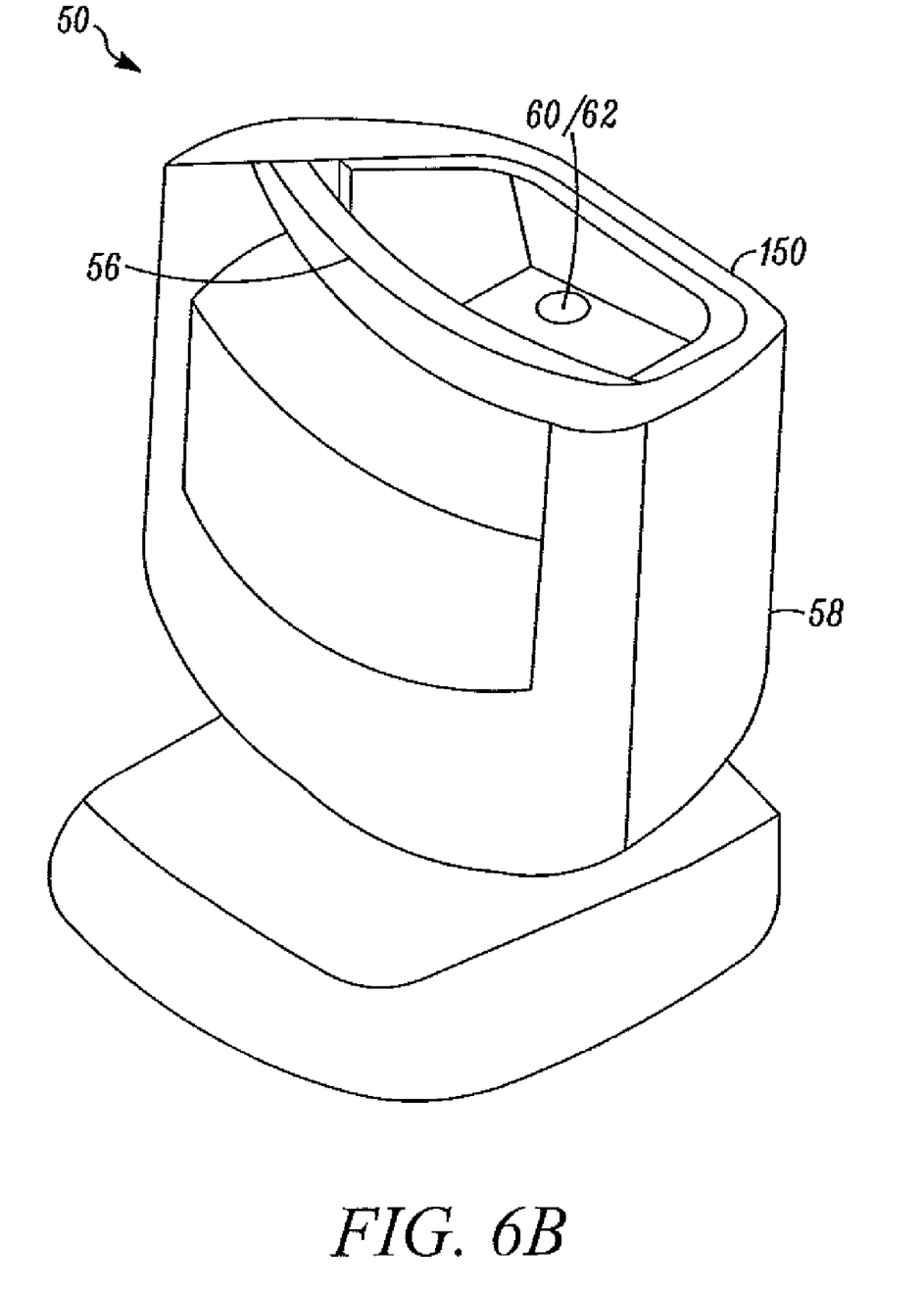

FIGS. 6A-6B depict an implementation of the object detecting system that includes a reflector for redirecting some invisible light toward a target object outside the window 56. The imaging scanner 50 includes the illuminating lens assembly 70 and the illumination source 72 for providing illumination directed toward a target object in front of the window 56, after reflecting by the mirror 130 in FIG. 5A. The imaging scanner 50 also includes the imaging lens assembly 60 and the imaging sensor 62 for capturing an image from the target object, after reflecting by the mirror 130 in FIG. 5A. The imaging scanner 50 has a chassis 150 within the housing 58.

The object detecting system of the imaging scanner 50 includes light emitting diodes 110A and 110B that emit mostly invisible light (e.g., infrared light). The object detecting system also includes a photodetector 120 configured to detect returned invisible light from the target object. An optical filter 122 is positioned in front of the photodetector 120 for increasing the signal-to-noise ratio and reducing the ambient light. The surfaces on the side walls of the chassis 150 can be used as a reflector for redirecting some of the invisible light 119A and 119B from the LEDs (i.e., 110A and 110B) toward the target object. As shown in FIG. 6A, the invisible light (119A and 119B) from the LEDs (i.e., 110A and 110B) is reflected from side walls 130A and 130B of the chassis 150. The chassis 150 is made out of plastic material. The plastic material can be of any color. When the light impinges on a surface, such as plastic, at a steep angle about 55 degrees, the reflection of the light could be quite high, about 15-30% depending on the incident angle and surface finish.

In some implementations, the side walls 130A and 130B of the chassis 150 can play similar functions as the mirrors 130A and 130B in FIG. 4. As such, it appears that the light originates not only from the LED light source itself (i.e., 110A and 110B) but also from the chassis walls 130A and 130B. Some of the invisible light 111A and 111B from the LEDs (i.e., 110A and 110B) is emitted directly toward the target object. Some of the invisible (119A and 119B) light from the LEDs (i.e., 110A and 110B), after redirected by the chassis walls 130A and 130B, are projected toward the target object as invisible light 119A and 119B in different directions. If a cell phone is placed in front of the window 56, these invisible lights from multiple different directions create multiple reflections from the cell phone screen, which results in significantly increased probability to catch a specular reflection from the cell phone by the detector. Another advantage of this improved object detecting system is that the light from the LED is redirected effectively towards the object/barcode and therefore benefits not only for detection of cell phones but regular paper barcodes as well.

In addition to the specific embodiments that have been described, various modifications and changes are possible. For example, the mirror for using as the reflector can be highly reflective or partially reflective. The surface of the reflector can be substantively diffusive or almost perfectively reflective. The diffusive surface can be integral part of the scanner housing or chassis. The surface of the reflector can be made from plastic or metals. The reflector can have a flat surface or a non-flat surface or textured. The reflector can have a metal coated surface on a plastic substrate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    a housing;
    an illumination source within the housing for providing illumination directed toward a target object;
    an imaging sensor having an array of photosensitive elements for capturing an image from the target object;
    a reflector within the housing;
    a light emitting diode (LED) operative to emit mostly invisible light within an invisible bandwidth, wherein the LED is configured to emit a first portion of the invisible light toward the target object directly and to emit a second portion of the invisible light toward the reflector, and wherein the reflector is configured to redirect at least some of the second portion of the invisible light toward the target object;
    a photodetector configured to detect returned invisible light from the target object to generate an electrical signal; and
    a controller configured to activate the illumination source for providing the illumination directed toward the target object for image capturing only if the electrical signal generated by the photodetector indicates that the returned invisible light from the target object is detected.

2. The apparatus of claim 1, wherein the reflector includes a mirror that is at least partially reflective.

3. The apparatus of claim 1, wherein the reflector includes two mirrors facing each other with an inclined angle larger than 30 degrees, each mirror is at least partially reflective.

4. The apparatus of claim 1, wherein the reflector includes a non-flat surface.

5. The apparatus of claim 1, wherein the reflector includes two non-flat surfaces.

6. The apparatus of claim 1, wherein the reflector includes a diffusive surface.

7. The apparatus of claim 1, wherein the reflector includes two diffusive surfaces.

8. The apparatus of claim 1, wherein the reflector includes a plastic surface.

9. The apparatus of claim 1, wherein the reflector includes two plastic surfaces.

10. The apparatus of claim 1, wherein the reflector includes a textured surface.

11. The apparatus of claim 1, wherein the reflector includes a metal coated surface on a plastic substrate.

12. The apparatus of claim 1, further comprising:
    a chassis; and
    wherein the reflector includes a surface of the chassis.

13. The apparatus of claim 1, further comprising:
    a filter positioned in front of the photodetector, the filter being configured to substantially block light having wavelengths that are not within the invisible bandwidth of the light emitted by the LED.

14. A method of operating a barcode reader to decode a barcode on a target object, the barcode reader includes an object detection system having a light emitting diode (LED) operative to emit mostly invisible light within an invisible bandwidth, the method comprising:
    activating the LED to emit a first portion of the invisible light toward the target object directly and to emit a second portion of the invisible light toward a reflector;
    redirecting with the reflector at least some of the second portion of the invisible light toward the target object;
    detect returned invisible light from the target object with a photodetector to generate an electrical signal;
    activating an illumination source for providing illumination directed toward the target object for image capturing only if the electrical signal generated by the photodetector indicates that the returned invisible light from the target object is detected; and
    capturing an image from the target object with an imaging sensor having an array of photosensitive elements.

15. The method of claim 14, wherein said redirecting with the reflector comprises:
    redirecting at least some of the second portion of the invisible light toward the target object with a mirror that is at least partially reflective.

16. The method of claim 14, wherein said redirecting with the reflector comprises:
    redirecting at least some of the second portion of the invisible light toward the target object with two mirrors that are at least partially reflective, the two mirrors facing each other with an inclined angle larger than 30 degrees.

17. The method of claim 14, wherein said redirecting with the reflector comprises:
    redirecting at least some of the second portion of the invisible light toward the target object with a non-flat surface.

18. The method of claim 14, wherein said redirecting with the reflector comprises:
    redirecting at least some of the second portion of the invisible light toward the target object with two non-flat surfaces.

19. The method of claim 14, wherein said redirecting with the reflector comprises:
redirecting at least some of the second portion of the invisible light toward the target object with a diffusive surface.

20. The method of claim 14, wherein said redirecting with the reflector comprises:
redirecting at least some of the second portion of the invisible light toward the target object with two diffusive surfaces.

21. The method of claim 14, wherein said redirecting with the reflector comprises:
redirecting at least some of the second portion of the invisible light toward the target object with a plastic surface.

22. The method of claim 14, wherein said redirecting with the reflector comprises:
redirecting at least some of the second portion of the invisible light toward the target object with two plastic surfaces.

23. The method of claim 14, wherein said redirecting with the reflector comprises:
redirecting at least some of the second portion of the invisible light toward the target object with a surface on a chassis.

24. The method of claim 14, further comprising:
reducing unwanted signals detected by the photodetector caused by unwanted ambient light, the unwanted ambient light having wavelengths that are not within the invisible bandwidth of the invisible light emitted by the LED.

25. An apparatus comprising:
an illumination source for providing illumination directed toward a target object;
an imaging sensor having an array of photosensitive elements for capturing an image from the target object;
a light emitting diode (LED) operative to emit mostly invisible light within an invisible bandwidth, wherein the LED is configured to emit a first portion of the invisible light toward the target object directly and to emit a second portion of the invisible light toward a reflector;
means for redirecting with the reflector at least some of the second portion of the invisible light toward the target object;
a photodetector configured to detect returned invisible light from the target object to generate an electrical signal; and
a controller configured to activate the illumination source for providing the illumination directed toward the target object for image capturing only if the electrical signal generated by the photodetector indicates that the returned invisible light from the target object is detected.

* * * * *